United States Patent [19]
King

[11] 3,753,834

[45] Aug. 21, 1973

[54] APPARATUS FOR SPLICING MAGNETIC TAPE

[75] Inventor: James L. King, Sudbury, Mass.

[73] Assignee: King Instruments, Corp., Hudson, Mass.

[22] Filed: Apr. 28, 1971

[21] Appl. No.: 138,204

Related U.S. Application Data

[62] Division of Ser. No. 9,552, Feb. 9, 1970, Pat. No. 3,637,153.

[52] U.S. Cl. .................... 156/506, 242/56, 242/58.4
[51] Int. Cl. .......................... B31f 5/06, B65h 19/20
[58] Field of Search ............ 156/502, 504, 505–506; 242/58.4, 67.3 R, 75.51, 181, 199

[56] References Cited

UNITED STATES PATENTS 3,152,227 10/1964 Durio .............................. 156/506 X
3,582,009 6/1971 Ceroll .............................. 156/506 X

FOREIGN PATENTS OR APPLICATIONS 638,642 3/1962 Canada .............................. 156/502

*Primary Examiner*—Philip Dier
*Attorney*—Schiller & Pandiscio

[57] ABSTRACT

Apparatus for splicing magnetic tape comprising a stationary splicing block and two moveable splicing blocks, said splicing blocks each having a surface for supporting tape, and means for moving said two movable splicing blocks alternately into and out of selected positions in which their said surfaces are contiguous with the said surface of the stationary block.

14 Claims, 15 Drawing Figures

JAMES L. KING
INVENTOR.

Schiller & Pandiscio

ATTORNEYS.

PATENTED AUG 21 1973 3,753,834

SHEET 02 OF 10

JAMES L. KING
INVENTOR.

Schiller & Pandiscio
ATTORNEYS.

JAMES L. KING
INVENTOR.

Schiller & Pandiscio
ATTORNEYS.

JAMES L. KING
INVENTOR.

Schiller & Pandiscio

ATTORNEYS.

JAMES L. KING
INVENTOR.

Schiller & Pandiscio
ATTORNEYS.

JAMES L. KING
INVENTOR.

Schiller & Pandiscio
ATTORNEYS.

JAMES L. KING
INVENTOR.

Schiller & Pandiscio

ATTORNEYS.

JAMES L. KING
INVENTOR.

Schiller & Pandiscio
ATTORNEYS.

JAMES L. KING
INVENTOR.

Schiller & Pandiscio
ATTORNEYS.

JAMES L. KING
INVENTOR.

Schiller & Pandiscio

ATTORNEYS.

APPARATUS FOR SPLICING MAGNETIC TAPE

This application is a division of my copending application Ser. No. 9552, filed Feb. 9, 1970 now U.S. Pat. No. 3,637,153 for TAPE WINDING MACHINE.

This invention relates to winding machines and more particularly to machines for splicing and winding tapes into cassettes.

The primary object of this invention is to provide a new method and apparatus for cutting, splicing and winding magnetic tape.

Another object is to provide a new method and apparatus for loading cassettes with magnetic tape.

A more specific object is to provide a new method and apparatus for splicing magnetic tape.

Another specific object is to provide a new and improved mechanism for cutting and splicing tape.

Magnetic tape cassettes are customarily available commercially with blank tape or with pre-recorded tape. In both cases the cassette consists of two rotatable spools or hubs, a leader attached to each spool or hub, and a predetermined length of magnetic tape having its ends spliced to the two leaders. In the manufacture of such cassettes, one common practice is to start with an empty cassette consisting of a cassette case with two hubs and a length of leader tape having one end connected to one hub and the other end connected to the other hub. The first step in filling the cassette with blank or pre-recorded tape is to cut the leader tape to form two discrete leaders. Then the magnetic tape to be wound into the cassette is spliced to one leader and the hub to which the one leader is connected is rotated to wind up a given length of magnetic tape. Thereafter the magnetic tape is cut and the trailing end of the given length of tape is spliced to the leader on the other hub. It also is common to start with only the two hubs each having a short leader, splice magnetic tape to the leader on one hub, wind a given amount of tape on said one hub, splice the trailing end of the tape to the leader on the other hub, and thereafter mount the two hubs in a cassette case.

While the foregoing procedures are standard practice, they involve substantial hand work which adds to manufacturing cost and limits production. They also have been limited by winding speed. Therefore, another particular object of this invention is to overcome or substantially diminish the limitations with respect to time, labor and cost attendant to prior procedures and apparatus for loading cassettes with magnetic tape.

The foregoing and other objects are achieved by novel apparatus comprising means for holding a supply reel of magnetic tape, means for supporting a tape cassette or the hubs of a tape cassette, a splicing assembly consisting of a stationary splicing head and first and second movable splicing heads alternately movable into contiguous relation with the stationary splicing head, means for releasably holding tape ends on the stationary and movable splicing heads, means for slitting tape supported by said splicing assembly, means for rotating the supply reel and one of the tape cassette hubs so as to cause magnetic tape spliced to a leader on said hub to be unwound from said supply reel and wound on said one hub, means for applying splicing tape to the abutting ends of leader and magnetic tapes supported by said splicing assembly, and control means for selectively operating the foregoing means so as to accomplish the following steps commencing with leader ends held on the stationary and first splicing heads and the end of a magnetic tape to be wound held on the second splicing head: moving said first splicing head away from said stationary splicing head and moving said second splicing head with the end of magnetic tape to be wound into contiguous relation with said stationary head, splicing together the ends of the leader on said stationary head and the magnetic tape on said second head, winding said spliced leader and tape onto the cassette hub to which said spliced leader is secured, terminating winding after a predetermined amount of magnetic tape has been wound, slitting said tape, moving said second splicing head with said magnetic tape away from said stationary head and moving first splicing head with the other leader back into contiguous relation with said stationary head, and splicing said other leader to the trailing end of the magnetic tape wound on the winding cassette hub. Additional means are provided for rotating one of the cassette hubs so as to pull in any slack in the magnetic tape after the second splicing operation has been completed. In one embodiment the control means is adapted to terminate winding after a predetermined measured length of tape has been wound. In an alternative embodiment for winding pre-recorded tape the control means is adapted to terminate winding in response to detection of an audio signal recorded on the magnetic tape.

Other features and many of the attendant advantages of the invention are set forth or rendered obvious by the following detailed specification which is to be considered together with the following accompanying drawings wherein.

Figure 3:
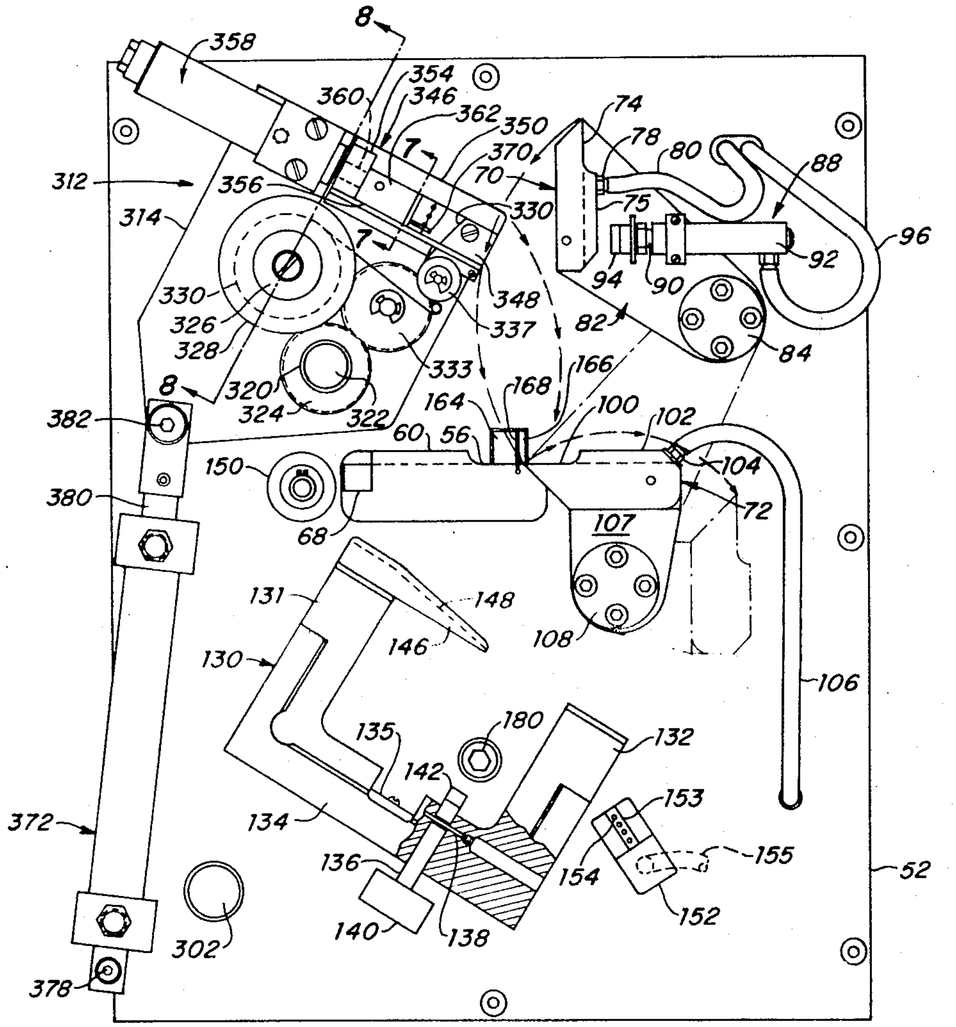
FIG. 3 is an enlarged view of a portion of the apparatus shown in FIG. 2.
Figure 8:
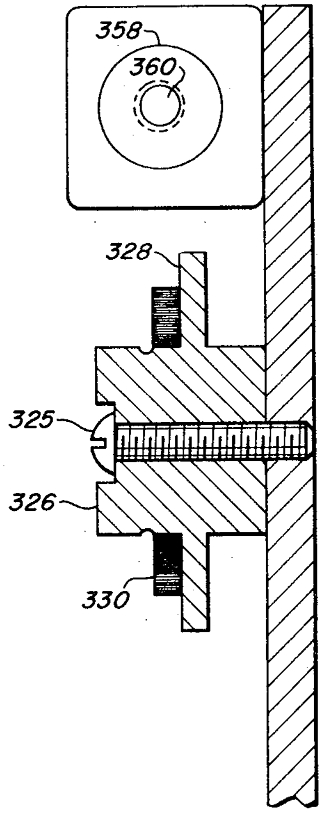
Figure 7:
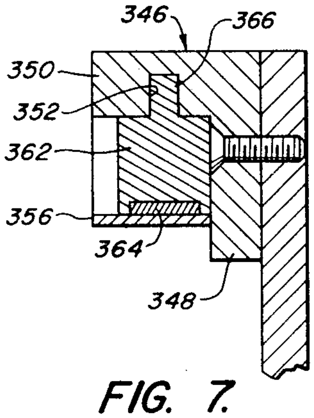
Figure 9:
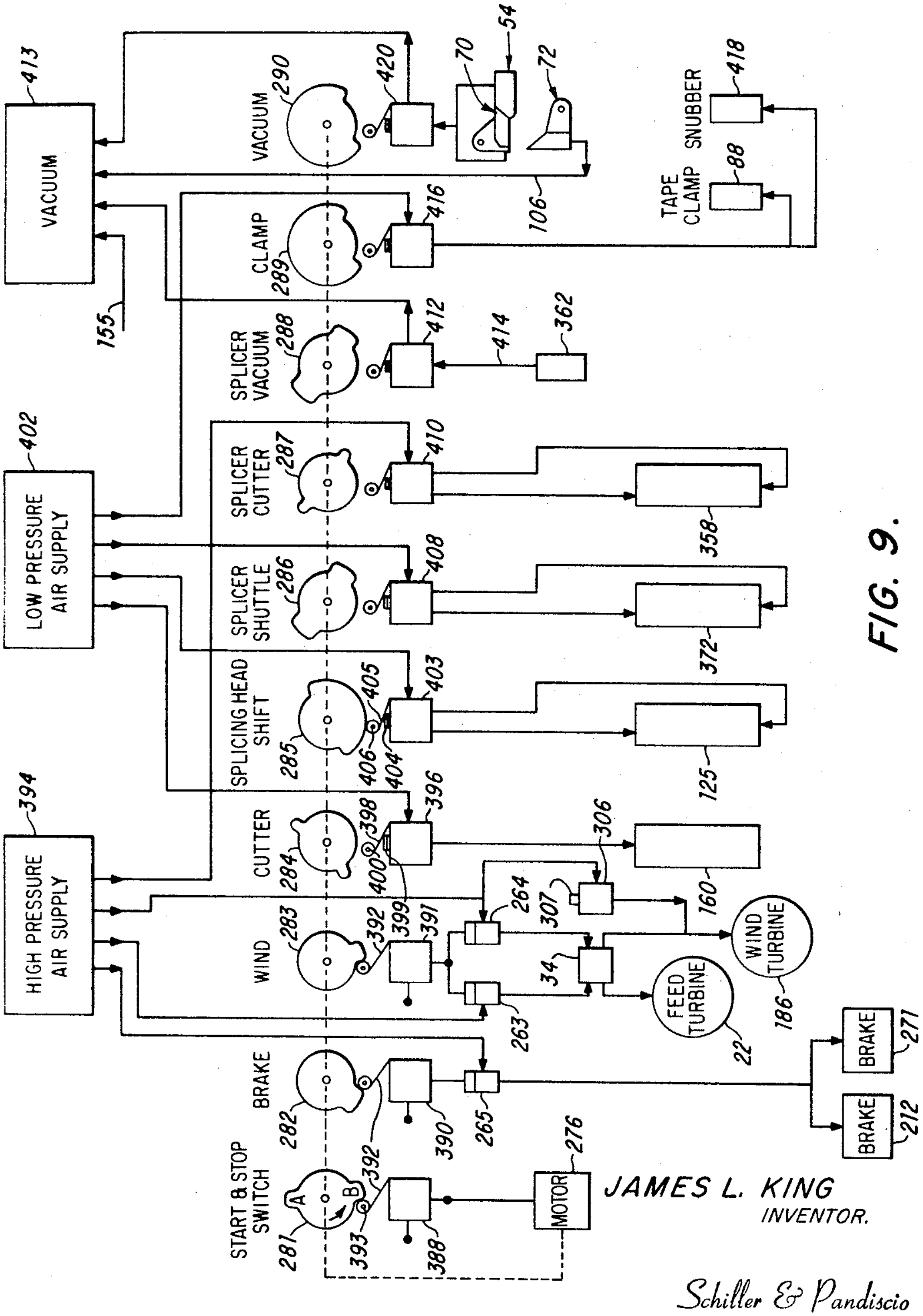
Figure 10:
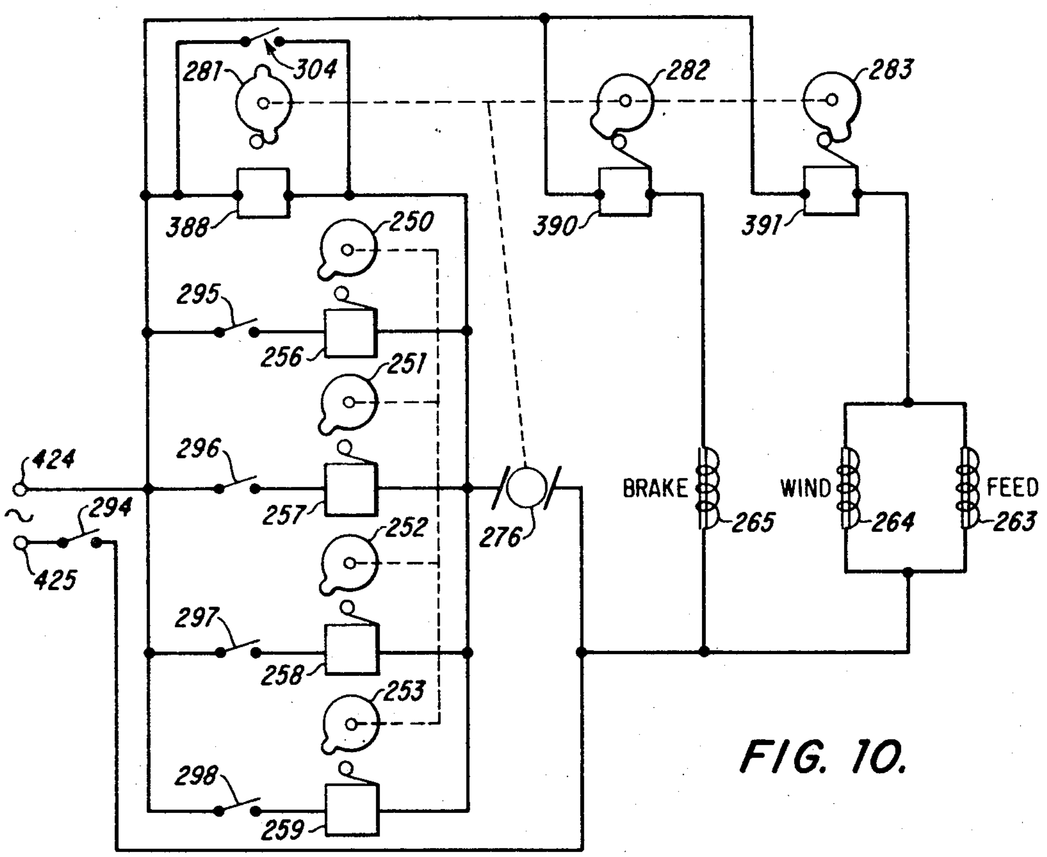
Figure 12:
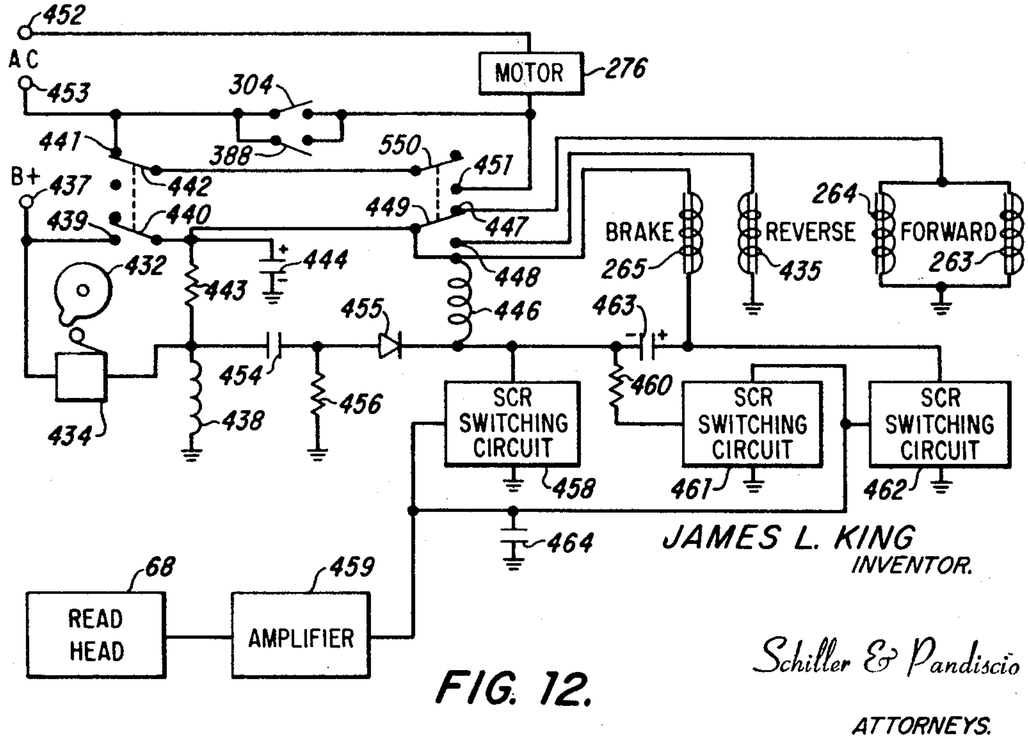
Figure 11:
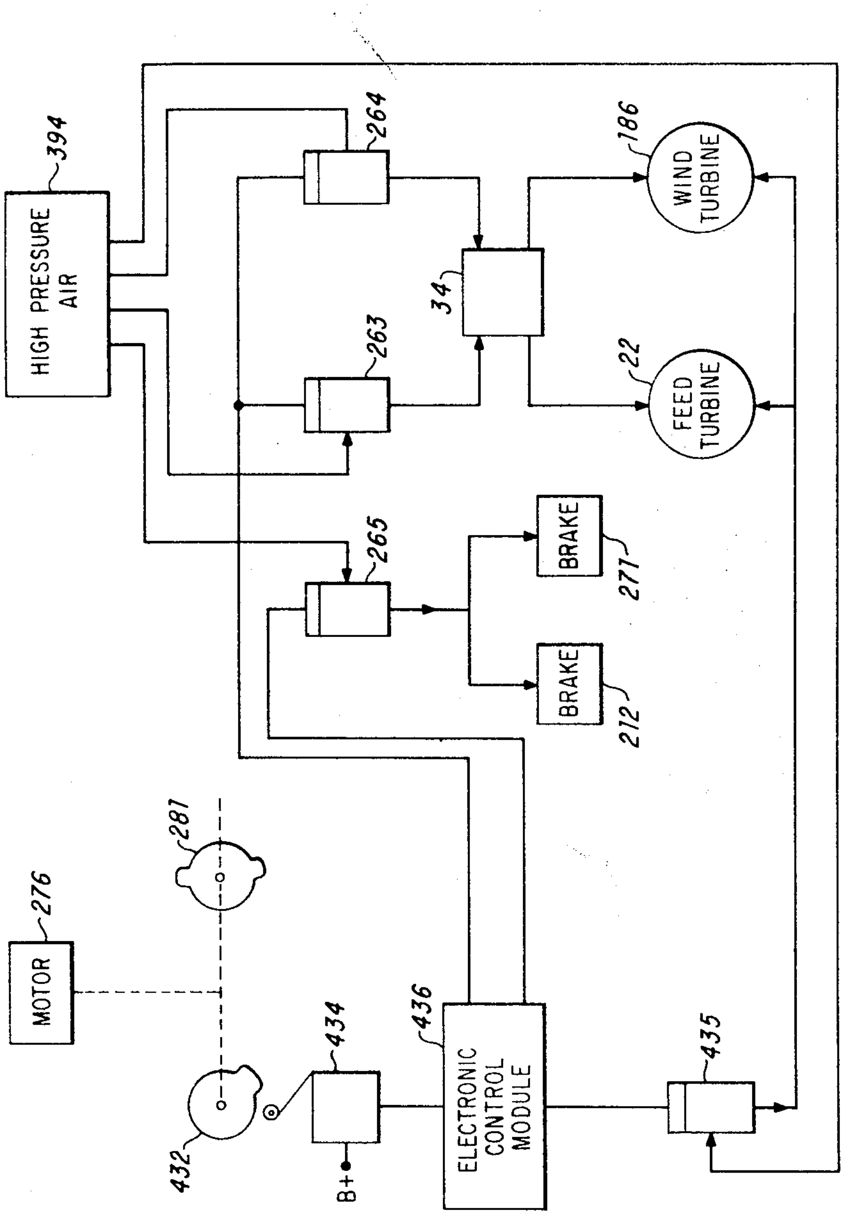

FIGS. 7 and 8 are sectional views taken on lines 7—7 and 8—8 respectively of FIG. 3;

FIGS. 9 and 10 are schematic diagrams of the pneumatic and electrical control system of the machine; and FIGS. 11 and 12 are schematic diagrams illustrating how the control system of FIGS. 11 and 12 is modified so that the machine can handle pre-recorded tape.

Figure 1:
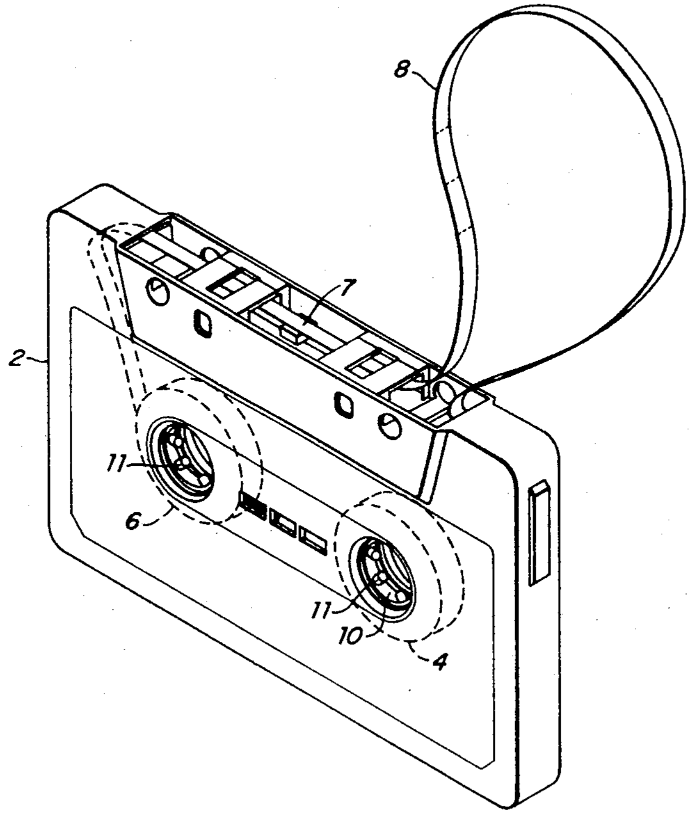
FIG. 1 is a perspective view of a typical tape cassette used with the present invention.

Turning now to FIG. 1, there is shown an empty magnetic tape cassette of conventional design. The empty cassette consists of a hollow case 2, two spools 4 and 6 rotatably mounted within the case, and a leader tape 7. Although not shown, it is to be understood that the opposite ends of the leader tape are secured to spools 4 and 6. The leader tape is long enough to permit a portion of it to be pulled out of the case as shown at 8 for splicing of magnetic tape as hereinafter described. Each spool has an aperture 10 to accommodate a driving spindle and also teeth 11 which when engaged by an appropriately shaped spindle will cause the spool to rotate with the spindle.

Figure 2:
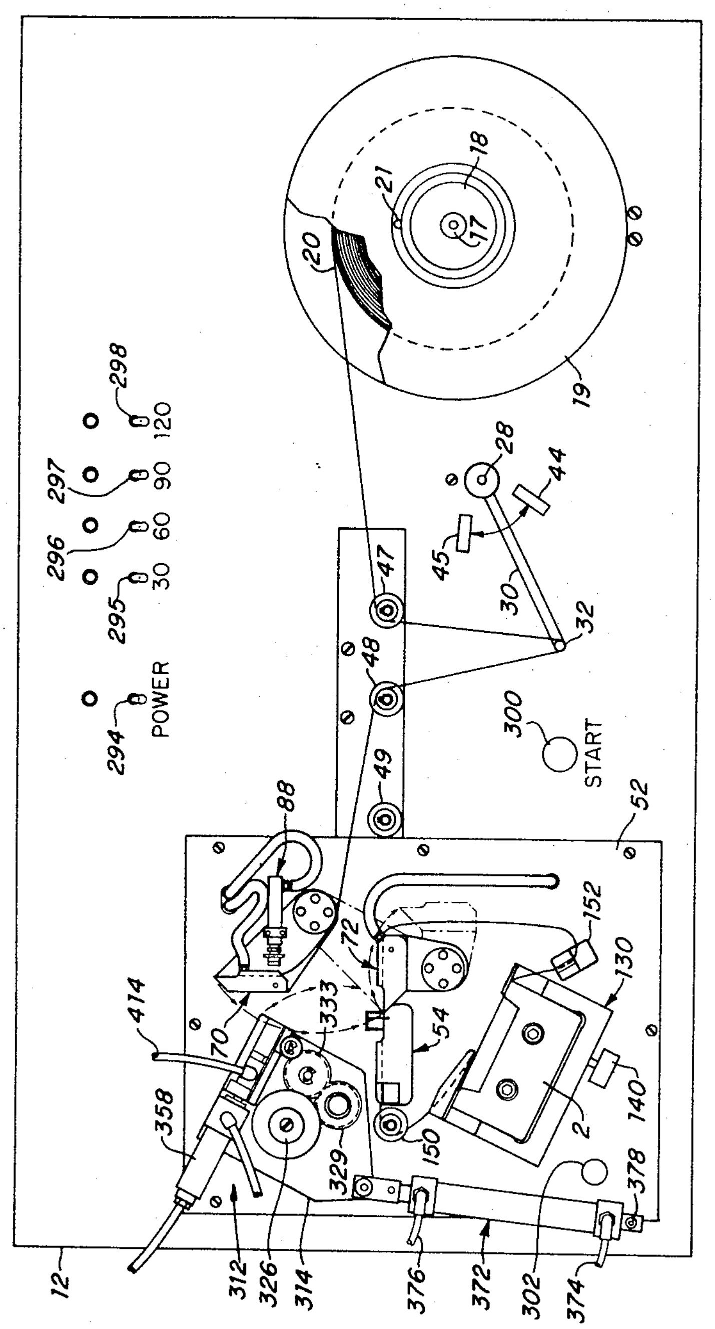
FIG. 2 is a front elevation of a winding machine constructed in accordance with this invention.
Figure 5A:
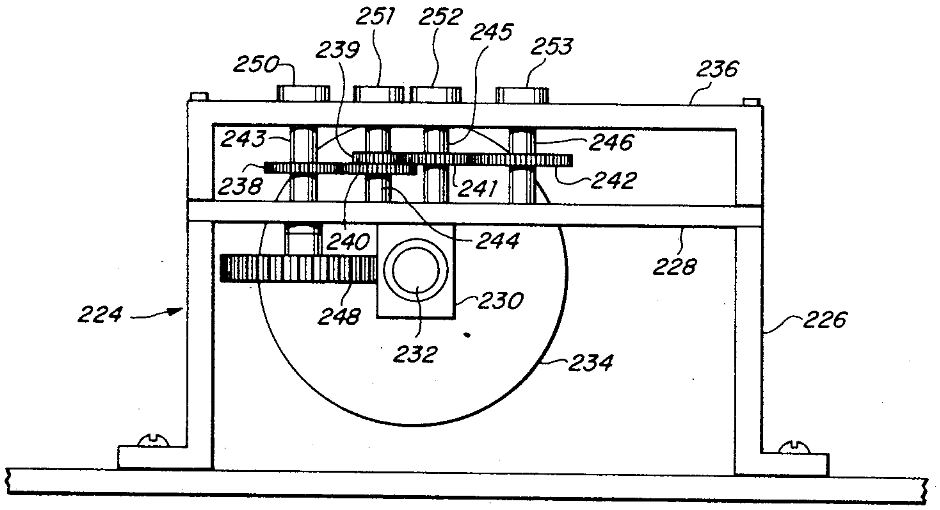
FIG. 5A is an enlargement of a portion of FIG. 5.
Figure 5:
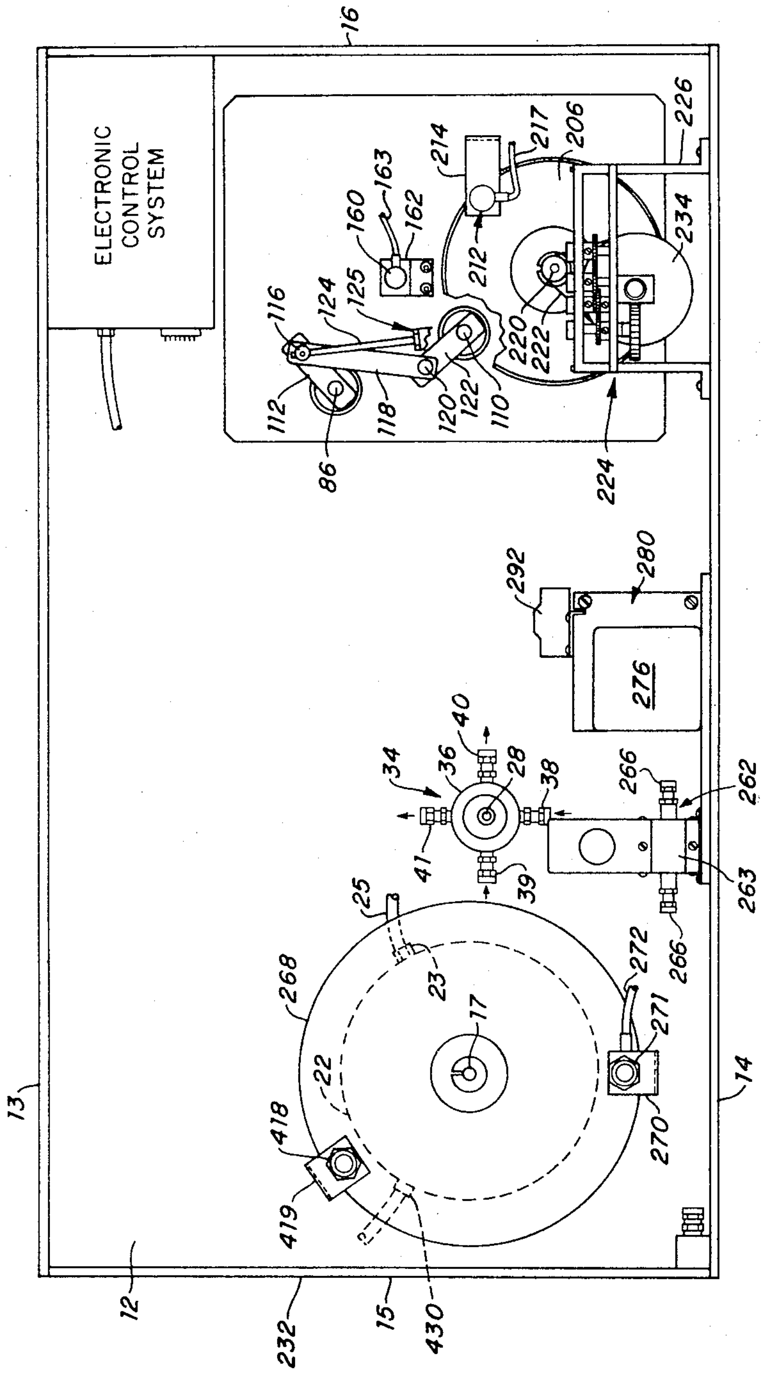
FIG. 5 is a rear view with certain elements omitted for convenience of illustration.

Turning now to FIGS. 2 and 5, the illustrated machine comprises a console having a front panel 12, a top panel 13, a bottom panel 14, and two side panels 15 and 16. Projecting through front panel 12 is a shaft 17 on which is affixed a hub 18. Removably mounted on hub 18 is a reel 19 on which is wound a supply of magnetic tape 20 that is to be used in filling cassettes. Hub 18 has a pin or key 21 which fits in a depression or keyway in the reel 19 so as to cause the reel and shaft to rotate as a unit. The shaft 17 is the output shaft of an air turbine 22 which is affixed to the rear side of panel 12. The housing of turbine 22 (which is hereafter called the "tape feed turbine") has a port in which is mounted a hollow fitting 23 that provides a connection for an air supply hose 25. The interior construction of air turbine 22 is not shown for convenience of illustration since it is essentially the same as that of the tape wind turbine 186 hereinafter described. Persons skilled in the art will appreciate that the cassette of FIG. 1 is substantially like the cassettes shown in U.S. Pat. Nos. 3423038 and 3167267.

Also extending through panel 12 is a rotatable shaft 28 on which is secured a radially-extending arm 30. The end of arm 30 carries a stub shaft 32. Although not shown it is to be understood that stub shaft 32 has a shallow peripheral groove whose width is slightly larger than the width of tape 20 so that the shaft 32 can function as a tape guide. Arm 30 and shaft 32 function as a slack takeup to maintain tension on tape moving from reel 19 through the splicing station hereinafter described to the cassette hub on which it is being wound. Referring to FIG. 5, shaft 28 is the operating stem of a four way rotary valve 34 whose housing 36 has two inlet ports provided with fittings 38 and 39 that provide connection for air hoses (not shown) and two outlet ports provided with fittings 40 and 41 that provide connections for two other air hoses (also not shown). Although not shown in detail it is to be understood that valve 34 comprises a rotary valve member mounted within its housing which has shaft 28 affixed thereto and which is adapted to increase or decrease the flow of air through fittings 38 and 39 to fittings 40 and 41 respectively as it is rotated by movement of arm 30. Two mechanical stops 44 and 45 on the front of panel 12 limit the angle through which arm 30 can rotate and thereby establish maximum and minimum flow of air through valve 34.

Also rotatably mounted on the front of panel 12 are three idler guide rolls 47, 48, and 49. The periphery of each roll is grooved so as to provide guidance for tape being transported to the splicing station.

Figure 3A:
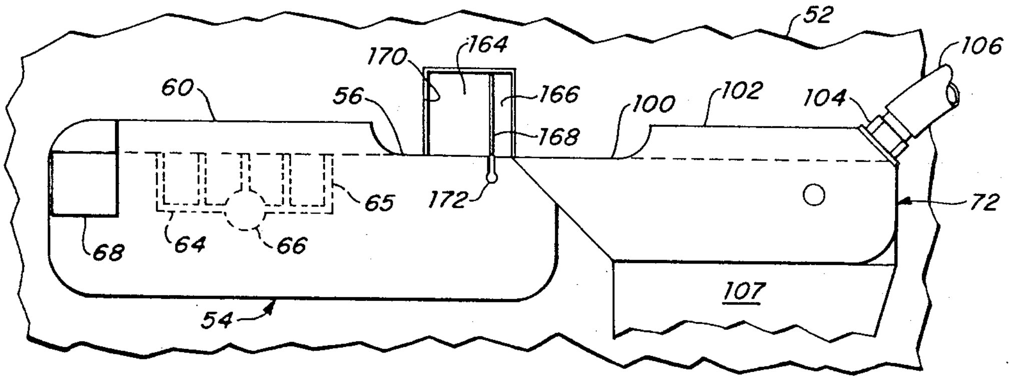
FIG. 3A is an enlargement of a portion of FIG. 3.

Referring now to FIGS. 2, 3, and 3A, the splicing station is a discrete subassembly mounted on a flat panel 52 that is securely mounted in a matching opening in panel 12 so as to be flush therewith. The splicing station comprises a stationary splicing head 54 affixed to the front side of panel 52. The head 54 is mounted so that its flat top surface 56 extends horizontally. A portion of the upper side of head 54 is provided with spaced side walls 60 that extend above its surface 56 and cooperate therewith to form a tape guide channel just wide enough to accommodate the tape 20. As shown in broken lines in FIG. 3A, the interior of head 54 has a long passageway 64 that communicates with a series of holes 65 in surface 64 and also with a side opening 66 to which is connected through panel 52 a hose line (not shown) leading to a source of suction for holding tape flat against surface 56. If pre-recorded tape is to be spliced and wound, one end of head 54 is cut away to accommodate a conventional magnetic reading head shown schematically at 68. The electrical leads (not shown) for reading head 68 pass through panel 52 to an electronic control system hereinafter described.

Associated with stationary splicing head 54 are two pivotally mounted splicing heads 70 and 72. The two heads are essentially similar. Splicing head 70 has a flat top surface 74 and also spaced side walls 75 that cooperate with surface 74 to form a tape guide channel similar to the one of stationary head 54. Holes 76 formed in surface 74 (see FIG. 4) are connected through an interior passageway (not shown) to a hole provided with a fitting 78 to which is secured a hose line 80 that also leads to the source of suction. Splicing head 70 is affixed to an arm 82 which is secured to a pivot block 84 having a shaft 86 that is rotatably mounted on and projects through panel 52. Also mounted on arm 82 is a conventional single acting pneumatic actuator 88 whose operating rod 90 is biased by a spring within the actuator's cylinder 92 so as to remain in the retracted position shown in FIG. 3 when no air pressure is applied to the cylinder. The end of rod 90 is provided with a resilient pressure pad 94 shaped and disposed so as to fit between the walls 75 defining the tape guide channel of splicing block 70. Application of adequate air pressure to actuator 88 by means of a connected hose line 96 causes its operating rod to be extended enough for the pad 94 to press a tape against surface 74.

Figure 4:
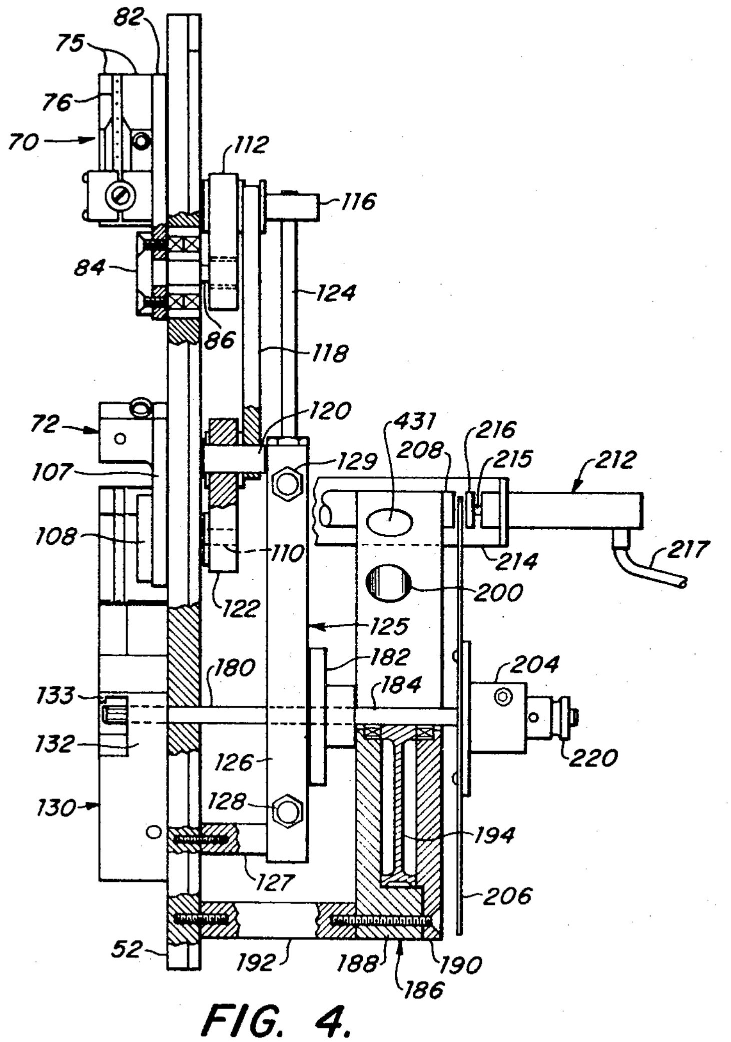
FIG. 4 is a side elevation, partly in section and with certain elements omitted, of apparatus shown in FIGS. 3 and 5.
Figure 4A:
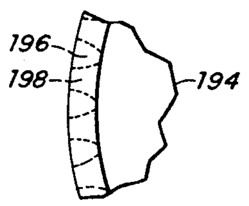
FIG. 4A is a view on an enlarged scale of a portion of the apparatus shown in FIG. 4.

Splicing head 72 is mounted below splicing head 70 and it also has a flat top surface 100 and spaced side walls 102 that form a tape guide channel similar to those of heads 54 and 70. Although not shown it is to be understood that splicing head 72 has holes in its surface 100 corresponding to holes 65 and 76, and also that these holes are connected by an interior passageway which leads to a port provided with a fitting 104. Connected to the latter is another hose line 106 which also connects to the source of suction. Splicing head 72 is affixed to an arm 107 that is secured to a pivot block 108 having a shaft 110 that projects through panel 52 as shown in FIG. 4. The two splicing heads 70 and 72 are mounted so that they can pivot between first positions wherein their surfaces 74 and 100 extend vertically and are displaced from surface 56 and second positions wherein surfaces 74 and 100 extend horizontally and are contiguous and coplanar with surface 56. It is to be noted that the end surfaces of splicing heads 70 and 72 are bevelled so as to mate with an inclined surface formed on the adjacent end of splicing head 54. The mechanical linkage for pivoting splicing heads 70 and 72, now to be described, is arranged to that when one of them is aligned with head 54 the other is displaced from head 54 and vice versa.

Turning now to FIGS. 4 and 5, affixed to the rear end of shaft 86 is a lever arm 112, the opposite end of which is rotatably mounted on a stub shaft 116. Also rotatably mounted on shaft 116 is another arm 118. The opposite end of link arm 118 is rotatably mounted on a stub shaft 120 that is rotatably attached to one end of a lever arm 122. The other end of lever arm 122 is affixed to shaft 110. As seen in FIG. 5, lever arms 112 and 122 are disposed at an angle of 90° to each other. Extending through and affixed to the end of shaft 116 is the operating rod 124 of a conventional pneumatic actuator 125 whose cylinder 126 is pivotally supported from panel 52 by a bracket 127. The air actuator is of the double-acting type and accordingly its cylinder 126 has two ports provided with air fittings 128 and 129 to which air hoses (not shown) are coupled. When air is supplied to the cylinder through fitting 128, the rod 124 is extended to the position shown in FIGS. 4 and 5, causing the splicing heads 70 and 72 to assume the positions shown in full lines in FIGS. 2 and 3. When air is supplied to the cylinder 126 via fitting 129, the rod 124 is retracted, causing lever arms 112 and 122 to rotate clockwise and counterclockwise (as seen in FIG. 5) through an angle of about 90° so as to place the splicing heads in the relative positions shown in phantom in FIGS. 2 and 3.

Referring now to FIGS. 2–4, affixed to the front of panel 52 is a U-shaped cassette holder 130 having pair of parallel arms 131 and 132 which are provided with depending lips 133. The base portion 134 of holder 130 includes a spring clip 135. The holder is loaded by slipping the top end of a cassette 2 under the lips 133 and then pressing the bottom portion in toward panel 52. Spring clip 135 yields enough to allow the cassette to be inserted and then acts to retain it in the holder. Release of the cassette is accomplished by means of an eject arm 136 which extends up through a slot (not shown) in the rear side of the holder and is pivotally mounted on a pin 138 secured in the holder. Eject arm 136 has an enlargement 140 at its bottom end which functions as a push button to eject a cassette from the holder. Arm 136 is made angular at its pivot point so that when its top end 142 is pressed against panel 52 by an inserted cassette, the enlargement 140 is spaced from panel 52. Hence when the operator presses enlargement 140, the eject arm pivots so that its top end 142 moves away from the panel to eject the cassette from the holder. Also attached to the upper end of arm 131 of holder 130 is an elongate member 146 which extends toward arm 132. The member 146 is tapered and its top surface is provided with a groove shown by dotted line 148 which is just wide enough to permit it to act as a tape guide channel. Tape moving over the stationary splicing head 54 to a cassette 2 in holder 130 via groove 148 is guided by an idler guide roll 150 rotatably mounted on panel 52 at the end of the stationary splicing head. Guide roll 150 is the same as rolls 47–49. Also mounted on panel 52 adjacent the arm 132 of cassette holder 130 is a block 152 provided with a groove 153 that is slightly wider than the tape leader of the cassette. The base of groove 153 is provided with holes 154 that are connected through an interior passageway (not shown) to a hose line 155 that leads behind panel 52 to a source of suction.

Referring now to FIGS. 2, 3, 3A and 5, the splicing station also includes a knife mechanism for slitting tape. The knife mechanism comprises single acting pneumatic actuator 160 affixed to the rear of panel 52 by means of a bracket 162. Actuator 160 is similar to actuator 88 and is connected by a hose line 163 to a source of pressurized air. Mounted on the end of the operating rod (not shown) of actuator 160 is a knife assembly which comprises an elongate block 164 to which is attached a plate 166 by means of screws (not shown). Clamped between block 164 and plate 166 is a knife blade 168 whose knife edge protrudes below the block and plate. The panel 52 has an opening 170 through which the knife assembly can move forward over the stationary splicing head when actuator 160 is operated. The knife blade is aligned vertically with a slot 172 formed in the upper surface of stationary splicing head 54. The knife blade is normaly withdrawn from slot 172 but moves forward into the slot when actuator 160 is operated. Although not shown it is to be understood that actuator 160 includes a compression spring that acts to retract its operating rod when air pressure is removed from its cylinder and which yields to permit extension of the operating rod so as to move the knife assembly over the stationary splicing head when air pressure is applied. Preferably the front end of the knife edge is rounded or slopes upward so as to assure that it will not catch on the side edge of whatever tape is to be cut.

Winding tape on a hub of the cassette 2 is achieved by means of a spindle 180 whose front end has a hexagonal cross-section so as to lock with the teeth of the cassette hub to be driven. Spindle 180 is rotatably mounted in panel 52 in position to receive and drive one of the hubs of the inserted cassette 2. Spindle 180 is connected through a conventional friction slip clutch shown schematically at 182 to the output shaft 184 of a tape winding turbine 186. The latter comprises a hollow housing consisting of a cylindrical body 188 and a side cover plate 190. The turbine housing is secured to the rear of panel 52 by means of a plurality of tie-rods 192. Mounted within the housing is a turbine rotor 194 provided with evenly spaced depressions 196 in its periphery so as to form a plurality of evenly spaced vanes 198. Rotor 194 is affixed to the shaft 184 which is rotatably mounted in bearings mounted in body 188 and cover plate 190. The side wall of body 190 is provided with a port 200 which is adapted to receive a fitting for connecting a hose line (not shown) leading to a source of pressurized air. Port 200 does not extend radially into the housing but is slanted with respect to the axis of shaft 184 so that air introduced through such port will cause the rotor to turn only in one selected direction, i.e., so as to cause the spindle 180 to rotate counterclockwise as seen in FIGS. 2 and 3.

The rear end of turbine shaft 184 projects outside of the cover plate 190 and mounted thereon is a hub 204 which carries a large metal brake disc 206. Hub 204 is locked to shaft 184. Mounted on the cover plate 190 is a brake pad 208 made of conventional asbestos-type brake lining material. Brake pad 208 is disposed adjacent theouter margin of disc 206. Associated with the latter and pad 208 is a single acting pneumatic actuator 212 secured to a bracket 214 which is attached to the rear side of panel 52. Actuator 212 is similar to actuator 88. The end of the operating rod 215 of actuator 212 carries a brake pressure pad 216 made of the same material as pad 208. Actuator 212 is shown in its at rest position in FIG. 4, i.e., with its operating rod retracted. Pressurized air is supplied on command to the cylinder of actuator 212 via a hose line 217. When air is applied to actuator 212, its operating rod is thrust forward so that its pressure pad 216 presses the edge of disc 206 against pad 208, thereby braking the turbine rotor so that it will come to a fast stop if relieved of its driving air pressure.

Also mounted on and locked to turbine shaft 184 is a pulley 220 for driving an endless belt 222 which in turn drives a tape length control assembly 224.

Referring now to FIG. 5A, the tape length control assembly comprises a frame 226 attached to floor panel 14. Frame 226 includes a horizontal plate 228 to which are secured two bearing brackets 230 (only one is visible in FIGS. 5 and 5A) which rotatably support a worm 232 at its opposite ends. Mounted on the forward end of worm 232 is a large pulley 234 which is driven by belt 222. Supported on frame 226 by and between plate 228 and a second like plate 236 is a gear train assembly comprising a plurality of spur gears 238, 239, 240, 241 and 242 and shafts 243, 244, 245 and 246. Gear 238 is affixed to shaft 243. Gears 239 and 240 are affixed to shaft 244. Gears 241 and 242 are affixed to shafts 245 and 246. Also affixed to shaft 243 is a worm gear 248 that meshes with worm 232. The several gears are arranged so that when worm 232 is rotated by the driving action of belt 222 on pulley 234, worm gear 248 is caused to rotate to drive the several gears 238-242. The gear ratios are set so that shaft 244 turns slower than shaft 243 and faster than shaft 245, with the latter turning faster than shaft 246. The gear ratios between worm gear 232 and shafts 243, 244, 245 and 246 are respectively 120:1, 160:1, 230:1 and 270:1. Affixed to shafts 243, 244, 245 and 246 are identical cams 250, 251, 252 and 253 that are disposed to close separate tape length control switches (not shown in FIGS. 5 and 5A) which are mounted on frame 226. These switches are shown at 256, 257, 258 and 259 in FIG. 10.

Also mounted behind panel 12 on floor panel 14 is an air control assembly 262 which comprises three solenoid-operated air valves 263, 264 and 265 shown in FIG. 10. The inlet and outlet ports of these valves are provided with suitable fittings 266 for connection of hose lines.

Still referring to FIG. 5, mounted on the rear end of output shaft 17 of tape feed turbine 22 is a metal brake disc 268 which is spaced from the rear side of the turbine in the same way as disc 206 is spaced from the tape wind turbine. Attached to a bracket 270 affixed to front panel 12 is a single acting penumatic actuator 271 identical to brake actuator 212. Although not shown in the drawings it is to be understood that the operating rod of actuator 271 carries a brake pressure pad like pressure pad 216 and that a rigid upstanding arm on bracket 270 located just behind brake disc 268 carries a brake pad similar to pad 208. Air to operate actuator 271 to brake the turbine 22 is supplied via a hose line 272.

Located to one side of air control assembly 262 and also mounted on floor panel 14 is an electric motor 276 which is connected to drive a cam assembly represented generally at 280. This cam assembly comprises cams 281–289 shown in FIG. 9. Mounted on cam assembly 280 is a bank of switches and air valves represented generally at 292 in FIG. 5 which are actuated by the various cams at selected times to control certain aspects of the machine's operation. The bank of switches and air valves are shown in greater detail in FIG. 10.

Referring now to FIG. 2, mounted in the front panel 12 are five toggle switches 294–298. Switch 294 is an on-off power switch. Switches 295–298 are tape length selection switches and are connected to switches 256-259 shown in FIG. 10. The exemplary designations "30," "60," "90," and "120" indicate the amount of tape supplied to each cassette in terms of minutes of playing time. Thus to set the machine so that it will load each cassette with enough tape to provide 120 minutes of playing time, the operator turns on switch 298.

Also accessible to the operator on the front panel of the machine are two push buttons 300 and 302. The former operates a normally open spring-biased switch 304 shown in FIG. 9. The latter button operates a spring-biased single acting air valve 306 shown in FIG. 9 which is normally closed. Button 300 is pressed to initiate a splicing and winding operation. Button 302 is pressed to jog the two turbines 22 and 186. Button 302 is used after the machine has completed a tape splicing and winding cycle to draw the trailing end of the spliced tape and the trailing leader into the cassette.

The splicing assembly also includes a splicing tape dispenser and applicator indicated generally by the numeral 312 in FIG. 2. Referring now to FIGS. 2, 3 and 6–8, the splicer-applicator comprises a plate 314 located in front of panel 52. Plate 314 has a pivot hole 316 and is pivotally attached to panel 52 by a shaft 318 on which is mounted a precision overrunning roller clutch represented generally by the numeral 320 which preferably is of the type available commercially from the Torrington Company of Torrington, Connecticut, under the model designation RC-101410. Although not shown in detail it is to be understood that this type of clutch comprises a cylindrical sleeve housing 321 having inturned flanges at each end and a plurality of circumferentially spaced ramps surfaces in its interior, plus a plurality of steel rollers each associated with a ramp surface and spring retaining means for the rollers. The rollers engage the shaft 318. The ramps are shaped so that if the housing is urged counterclockwise as seen in FIG. 3, the rollers will advance into locked position on the ramps, locking the clutch housing to the shaft. However, if the housing is urged clockwise, the rollers disengage from the ramps, permitting the clutch housing to rotate on the shaft. The shaft 318 has an enlarged head 322 at one end which engages one face of the clutch housing. The other end of shaft 318 has a reduced diameter so as to fit into a pivot hole 316 provided in carriage plate 314. The junction of the main portion of shaft 318 and its reduced end forms a shoulder which engages plate 314. The reduced end of shaft 318 has a tapped hole to receive a cap screw 323 which locks it to panel 52. A drive gear 324 is press-fitted onto the clutch housing.

Also carried by carriage plate 314 is a threaded stud 325 on which is mounted a hub 326 having an enlarged flange 328. Hub 326 serves to hold a roll of adhesive splicing tape 330. The hub 326 is sized so that the roll of tape 330 fits snugly but can rotate thereon when the end of the tape is pulled. Press-fitted into a hole in plate 314 is a stud 332 on which is rotatably mounted a gear 333 which meshes with gear 324. Gear 333 is held on stud 332 by a conventional retaining ring 334. Located near stud 332 is another shaft 336 which also is press-fitted into plate 314. Rotatably mounted on shaft 336 is a tape feed roll 337 and another smaller gear 338 which meshes with gear 333. The feed roll 337 is locked to gear 338 and has a knurled surface. A retaining ring 340 holds feed roll 337 and gear 338 on shaft 336. Mounted on plate 314 below and parallel to shaft 336 is a stud 342 which has a peripheral groove 344 with a width and depth that allows it to act as a splicing tape guide. The groove 344 is aligned with feed roll 337 and also with that portion of hub 326 on which is mounted the roll of splicing tape 330.

The plate 314 also carries means for cutting the splicing tape into short lengths and pressing it into place over the joint to be spliced. Such means comprise a stationary mounting block 346 having an L-shaped cross-section with a base 348 affixed to plate 314 by screws and a side wall 350. The latter has a U-shaped, i.e., rectangular, longitudinally extending keyway slot 352. Secured to one end of block 346 is a bearing block 354 having a hole to slidably accommodate the operating rod of pneumatic actuator 358 described below. Affixed at one end to bearing block 354 is a elongate plate 356 made of tool steel. The other end of plate 356 is free to flex. Plate 356 extends parallel to side wall 350 and cooperates with that wall and the base 348 of block 346 to define a rectangular channel. The surface of plate 356 facing side wall 350 is ground flat so as to assure a good shearing action by knife blade 364 described below. Plate 356 has a narrow elongate slot (not visible in the drawing) through which splicing tape 330 is advanced into the aforesaid rectangular channel.

Figure 6:
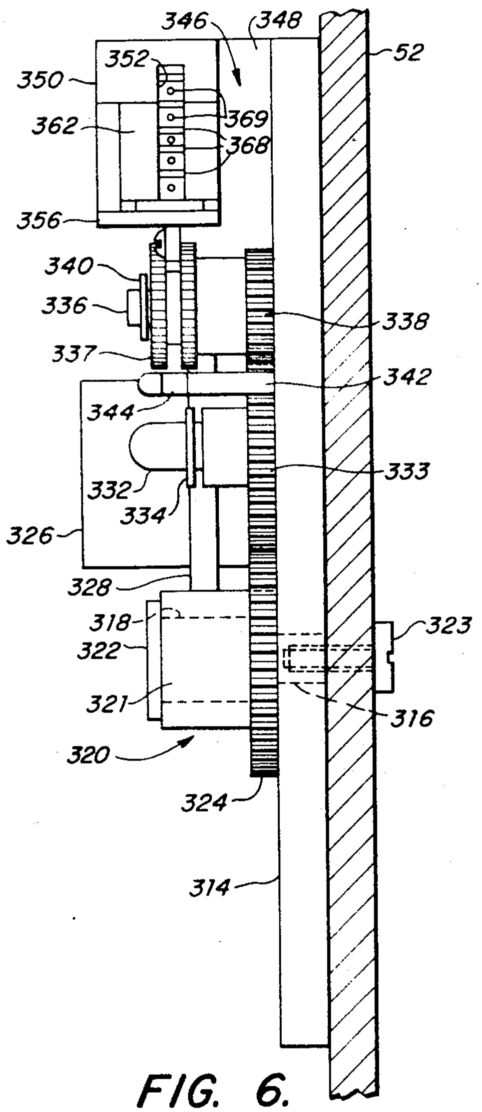
FIG. 6 is a partial side view of the splicing tape dispenser-applicator looking from right to left in FIG. 3.

Attached to plate 314 at one end of mounting block 346 is a conventional double acting pneumatic actuator 358 similar to actuator 125. The actuator's operating rod 360 extends through the aforementioned hole in bearing block 354. The latter not only functions to slidably guide rod 360 but it also acts as a stop for a rectangular metal slide block 362 which is affixed to the end of rod 360 and is mounted in the channel formed by side wall 350 and plate 356. Detachably mounted in a recess in one side of slide block 362 is knife blade 364. The latter and the corresponding side of slide block 362 are in slidable engagement with the tool steel plate 356. Slide block 362 has a key or tongue 366 formed on the side opposite to knife blade 364 which makes a snug sliding fit in keyway slot 352. Mounted in grooves milled in the end face of slide block 362 are solid rubber members 368 which function as pressure pads. These pads have the same length as the width of the splicing tape 330 and are aligned (as seen in FIG. 6) with the feed roll 337 and the groove 344 in stud 342. Also mounted in the end of slide block 362 at opposite sides of the row of rubber members 368 are two elongate pins 370 which serve to prevent sidewise movement of splicing tape severed by knife blade 364 as the slide block is driven forward by operation of actuator 358.

The pivot point of plate 314 is located so that when it is pivoted clockwise from the position shown in FIG. 3, the channel defined by block 346 and plate 356 will be aligned with the knife slot 172 and the pressure pads 368 (upon operation of actuator 358) will evenly engage the upper surfaces of the stationary splicing block 54 and whichever of the two movable splicing blocks 70 and 72 is contiguous with the stationary splicing block. Preferably when plate 314 is in its down position the end surface of mounting block 346 lightly engages the same splicing blocks. The operating stroke of actuator 358 carries the pressure pads 368 down far enough for splicing tape to be applied to tapes on the splicing heads with ample pressure to make a good splice. Pivotal movement of plate 314 is achieved by means of a double-acting pneumatic actuator 372 that is similar to actuator 125 and whose cylinder is connected via two hose lines 374 and 376 to a source of pressurized air. The bottom end of the cylinder of actuator 372 is pivotally mounted as at 378 to panel 12 and the end of its operating rod 380 is pivotally attached at 382 to plate 314. When air is supplied via hose line 374 the actuator's rod 380 is caused to be extended to pivot plate 314 clockwise. The plate 314 is returned to the position shown in FIGS. 2 and 3 by application of air pressure via hose line 376.

Operation of the tape applicator is straightforward. Assume that splicing tape has been located around feed roll 337 and stud 342 and extends through the tool steel knife shear plate 356 far enough to engage the base of groove 352 in side wall 350 of block 346. When actuator 372 is operated to pivot carriage plate 314 clockwise as seen in FIG. 3, the clutch 320 rotates on pivot shaft 318 under the influence of gear 333 which does not rotate on its axis but moves with plate 314. Because gears 333 and 338 do not rotate on their axes, no splicing tape is advanced by feed roll 337. As the plate 314 reaches the bottom end of its stroke, actuator 358 is operated. When this occurs the knife blade 364 shears off that portion of the splicing tape extending into the channel between knife shear plate 356 and side wall 350. The severed section of splicing tape is forced by pads 368 down along the channel (one end of the severed tape rides in groove 352) and pressed onto tape ends to be spliced positioned on the splicing blocks. Actuator 358 is reversed before carriage plate 314 starts to pivot upward again under the force of actuator 372. As carriage plate 314 moves back to its original position clutch 320 locks on pivot shaft 318. Hence gear 324 remains stationary and gear 333, moving with plate 314, travels along gear 324 and as it does it rotates and causes rotation of gear 338. The latter in turn rotates feed roll 337 so as to advance splicing tape through the knife shear plate 356. The gears 325, 333 and 338 are sized so that during the return pivotal movement of carriage plate 314 just enough splicing tape is advanced for the end thereof to extend into the groove 352 in front of slide block 363. Hence on the next and each subsequent cycle of operation the length of splicing tape cut by knife 364 is the same.

FIGS. 9 and 10 illustrate the pneumatic and electrical control system for the machine above-described wherein the length of tape wound is determined by operation of tape length selection switches 295–298. In addition to those elements already mentioned, the control system includes other elements hereinafter described. The programming cams 281–290 have different predetermined shapes as illustrated designed to effect operation of selected switches and valves at predetermined times. Cam 281 operates a motor control switch 388 and cams 282 and 283 operate solenoid valve control switches 390 and 391. Switches 388, 390 and 391 each have a spring-biased sctuating 392 fitted with a roller 393 that acts as a cam follower. Switch 388 is normally closed and opens when its roller 393 rides on the lobe of cam 281, i.e., the lobe of cam 281 moves arm 392 to open switch 388. Switches 390 and 391 are normally open but close when their operating arms are moved by the lobes of cams 282 and 283 respectively. Switch 390 operates the solenoid air valve 265 which connects the brake actuators 212 and 271 to a regulated high pressure (e.g., about 100 psi) air supply 394. Switch 391 operates solenoid air valves 263 and 264 which connect air supply 394 to turbines 21 and 186 via the rotary air valve 34. The high pressure air supply 394 is also connected to turbine 186 by manual air valve 306 which is used for jogging the wind turbine. Manual air valve 306 is a single way normally closed air valve. As used herein, "single way valve" is a valve having one inlet port and one outlet port and a valve member which can open or close with respect to said ports, while a "two way valve" is a valve with an inlet port and two outlet ports and a valve member which is moveable to selectively connect the inlet port to one or the other of the two outlet ports. Although not shown in detail it is to be appreciated that valve 305 is of conventional design and that is includes an internal spring which holds its valve member in closed position. Its valve member is moveable axially and has a stem 307 to which jog button 302 is attached.

Cam 284 operates another single way normally closed air valve 396. The latter is the same as valve 306 except that it has a pivotal arm 398 that acts on its valve stem 399 to move its valve member to open position. Arm 398 has a roller 400 that engages and acts as a cam follower for cam 284. Valve 396 is open when its roller 400 is riding on the lobe of cam 284. Valve 396 connects a regulated low pressure (e.g., about 40 psi) air supply 402 to the knife operating air cylinder 160.

Cam 285 operates a two way valve 403 having an operating stem 404 and a pivotal actuating arm 405 fitted with a cam following roller 406. The inlet port of valve 403 is connected to air supply 402, while its two outlet ports are connected to the opposite ends of the air cylinder 125 that effects shifting of the two moveable splicing heads. The operating rod of air cylinder 125 is normally extended. It retracts when the cam follower 406 rides on the lobe of cam 285 and returns to its normal extended position when the cam follower rides off of the cam lobe.

Cam 286 operates another two way valve 408 that is the same as valve 403. Valve 408 has its inlet port connected to air supply 402 and its two outlet ports connected to the opposite ends of air cylinder 372 that effects pivotal movement of plate 314 of the splicing tape dispenser-applicator. The operating rod of air cylinder 372 is normally retracted. It is extended when the cam follower of air valve 408 rides on one of the lobes of cam 286. It returns to its normal retracted position when the cam follower of valve 408 rides off the cam lobe.

Cam 287 operates another two way valve 410 that is identical to valves 403 and 408. Valve 410 has its inlet port connected to air supply 394 and its outlet ports connected to the opposite ends of air cylinder 358 that effects movement of the splicing tape knife 364. The operating rod of air cylinder 358 is normally retracted. It shifts to extended position when and only while the cam follower of valve 410 is acted on by one of the lobes of cam 287.

Cam 288 operates another single way normally closed valve 412 that is identical to valve 396. Valve 412 has one port connected to a source of vacuum 413 such as a vacuum pump and the other port connected via line 414 to the slide block 362 of the splicing tape-dispenser applicator. When valve 412 is opened it applies suction via line 414 and holes 369 to the splicing tape that is against the rubber pressure pads 368.

Cam 289 operates another single way normally closed air valve 416 that is identical to valves 396 and 412. Valve 416 has its inlet port connected to low pressure air supply 402 and its outlet port connected to tape clamp air cylinder 88 and another cylinder 418 (see also FIG. 5) that is identical to brake cylinder 271. It is mounted adjacent to brake disc 268 by a bracket 419 that is attached to the rear side of panel 12 and the end of its operating rod has a pressure pad (not shown) similar to pressure pad 216 shown in FIG. 4. A brake pad (not shown) similar to pad 208 shown in FIG. 4 is mounted on turbine 21 behind brake disc 268 in alignment with cylinder 418. When cylinder 418 is actuated its pressure pad presses the brake disc against the brake pad to snub, i.e. hold, the brake disc against rotation.

Cam 290 operates another single way normally closed air valve 420 that is identical to valve 416. Valve 420 has one port connected to the source of vacuum 413 and its other port connected via line 80 (FIG. 3) to the upper moveable splicing head 70 and via a line 421 and port 66 (FIG. 3A) to the stationary splicing head 54. Vacuum source 413 is also connected via lines 106 and 155 to the lower moveable splicing head 72 and the leader holder 152.

FIG. 10 shows how the above-mentioned electrical components are connected. The illustrated circuit has a pair of input terminals 424 and 425 which are to be connected to a suitable a.c. power supply. The tape selection toggle switches 295, 296, 297 and 298 are connected between terminal 424 and one side of motor 276 in parallel with each other and in series with cam-controlled switches 256, 257, 258 and 259 respectively. The other side of motor 276 is connected to terminal 425 via the power toggle switch 294. Also connected in series between terminal 424 and one side of motor 276 is the cam-controlled motor switch 388. The start switch 304 is connected across switch 388. The cam-controlled brake switch 390 and the solenoid of the brake air valve 265 are connected in series with power switch 294 and power input terminals 424 and 425. The solenoids of air valves 263 and 264 are connected in parallel with each other and in series with cam-controlled switch 391, power switch 294 and power input terminals 424 and 425.

A brief summary of how the above-described apparatus operates to automatically splice and wind magnetic tape into a cassette will now be described. For the purposes of this description, assume that power switch 294 and tape selection switch 298 are both closed, the moveable splicing heads are in the position shown in FIGS. 2 and 3, and that the machine has just completed a splicing and winding operation. A new cassette 2 having a length of leader tape with one end wound about one of the cassette hubs and the other end connected to the other cassette hub is mounted in holder 130. Before the cassette is inserted in holder 130, enough leader tape is pulled out of the cassette to form a loop large enough to extend over suction block 152 and splicing heads 54 and 72. With the cassette in the holder, the loop is reversed and then positioned so that it runs from the left-hand cassette hub down along the groove 153 of suction block 152, then over splicing heads 72 and 54 in the order named, around idler roll 52, and along groove 148 of member 146 to the right hand cassette hub. Since the machine has just completed a splicing and winding operation, motor 276 is off and the cam 281 is stopped with its lobe A holding motor switch 388 open; also cams 289 and 290 are stopped so that air valves 416 and 420 are held closed, thereby the end of tape to be spliced is clamped by air cylinder 88 to the upper splicing head 70, the feed turbine is held against movement by the snubbing action of cylinder 418 on brake disc 268, and vacuum is being applied to splicing head 70 and also the stationary splicing head 54. Suction is also applied constantly to block 152 and the lower splicing head 72. Hence the loop of leader from the cassette will be held in place in the grooves of splicing heads 54 and 72 and block 152 by suction. Now the start button 300 is pressed to momentarily close start switch 304. This energizes motor 276 and the cam 281–290 begin to turn. As soon as cam 281 turns far enough for its lobe A to ride off of the cam follower of switch 388, the latter closes to establish a holding circuit for the motor so that the motor will continue to run even after start button 300 is released to reopen switch 304. Motor 276 will keep the programming cams 281–290 turning until motor switch 388 is opened by lobe B of cam 281. Rotation of cams 281-290 causes them to operate switches 388–391 and valves 396, 403, 408, 410, 412, 416 and 420 at predetermined times to effect the following sequence of operations. First knife cylinder 160 operates to thrust knife blade 168 forward and backward rapidly, thereby slitting the leader into two discrete sections. As knife blade 168 returns to its withdrawn at-rest position, air cylinder 125 is operated to simultaneously pivot splicing head 72 clockwise and splicing head 70 counterclockwise (as viewed in FIG. 3), so that splicing head 72 occupies the position shown in broken lines and splicing head 70 is contiguous with stationary splicing head 54. At this point the end of the magnetic tape on splicing head 70 abuts the end of the leader on the stationary splicing head 54. Almost as soon as this shifting of the splicing heads occurs, the cylinder 372 is operated to pivot the splicing tape dispenser-applicator assembly clockwise down over the splicing heads 54 and 70. As the operating rod of cylinder 372 reaches its extended position, the air cylinder 358 is operated to cause knife blade 364 to cut a section of splicing tape 330. Simultaneously cam 288 operates air valve 412 so that suction is applied to the slide block 362 of the splicing tape dispenser-applicator, causing the severed section of splicing tape to be held firmly against the rubber pressure pads 368. The suction is terminated just as the severed section of splicing tape is brought into contact with the abutting ends of the tape leader and magnetic tape on splicing heads 54 and 70, where it is pressed by rubber pads 368 hard enough to make a firm splice. Then cam 287 causes valve 410 to reverse its position to retract the operating rod of air cylinder 358, thereby returning the splicing tape knife 364 to its original position. This return movement of knife 364 is followed by reverse operation of air cylinder 372, causing counterclockwise pivotal movement of the splicing tape applicator-dispenser assembly back to the position shown in FIG. 2. This counterclockwise return movement causes additional splicing tape to be advanced into the channel defined by plate 356 and block 346. At the same time or immediately thereafter valve 420 reopens to remove suction from splicing heads 54 and 70 and valve 416 reopens to cause air cylinder 88 to unclamp the magnetic tape on splicing head 70 and air cylinder 418 to release the brake disc of feed turbine 21.

By this time in the cycle cam 281 has turned far enough for its lobe B to reopen motor control switch 388, whereupon the motor is deenergized to stop rotation of cams 281–290. It is to be noted that cam 283 is positioned so that its lobe closes the switch 391 when the lobe B of cam 281 reopens motor control switch 388. Accordingly, as motor 276 is stopped, the solenoids of valves 263 and 264 are energized to open the valves and introduce high pressure air to the feed and wind turbines 21 and 186. The turbines accelerate rapidly and the winding operation proceeds at a fast rate. As tape is paid off of supply roll 20 and would onto the right-hand spool of the cassette (as seen in FIG. 2), the dancer arm 30 moves according to the tension in the moving tape, pivoting upward under the force exerted by the tape on guide roll 32 when the tension increases and pivoting downward under the influence of gravity when the tension decreases. This movement of arm 30 causes rotary valve 34 to vary the rate of air flow to the two turbines, increasing the speed of feed turbine 21 and decreasing the speed of wind turbine 186 when the tape tension becomes greater and oppositely changing the turbine speeds when the tension becomes less. This synchronization of the speeds of the two turbines prevents tape breakage from excess tension and tape pileup and loose winding in the cassette due to the feed roll speed being excessive in relation to the speed of winding spindle 180.

As soon as the winding turbine begins to run, cams 250–253 begin to turn. Because of the aforementioned ratios of the gears driven by worm 232, the relative angular position of the lobes of cams 250–253 will change as they are rotated. Cam 250 will close tape length control switch 256 after the wind turbine has operated long enough to wind a length of tape providing 30 minutes of playing time (based on dual track recording). Similarly tape length control switches 257, 258 and 259 will be closed by the lobes of cams 251, 252, and 253 after tape lengths providing 60, 90 and 120 minutes of playing time have been advanced by the feed turbine. Since in this particular winding operation the tape length selection switches 295, 296 and 297 are open, operation of the machine is not affected by the sequential closing of tape length control switches 256, 257 and 258. However, since tape length selection switch 298 is closed, when tape length control switch 259 is closed by cam 253 a closed circuit is established to restart motor 276. Although switch 259 is closed only momentarily by cam 253, its "on" period is long enough for the motor to rotate the programming cams sufficient for the lobe B of cam 281 to move out of contact with the operating arm of motor control switch 388, whereupon the latter switch recloses to keep the motor running.

On resumption of rotation of the programming cams, the lobe of cams 283 moves clear of switch 391, allowing the latter to reopen and thereby deenergize the solenoids of valves 263 and 264. These valves immediately reclose, terminating flow of air to the two turbines. Immediately thereafter the lobe of cam 282 closes switch 390 to energize the solenoid of air valve 265. The latter opens to supply air to the brake cylinders 212 and 271, whereupon the turbines are rapidly braked to a dead stop. Brake cylinders 212 and 271 are held on just long enough to stop the two turbines.

Thereafter cams 289 and 290 reclose switches 416 and 420, whereupon air cylinders 88 and 418 are actuated to clamp the magnetic tape to splicing head 70 and snub the brake disc of feed turbine 21, and suction is reapplied to splicing heads 54 and 70. Then the knife cylinder 160 is again actuated briefly to slit the tape held on splicing heads 54 and 70. This is followed by operation of air cylinder 125 so as to shift the moveable splicing heads 70 and 72 back to their original positions. Then air cylinders 372 and 358 are sequentially operated in the same manner as at the beginning of the operating cycle so as to apply a piece of splicing tape to the trailing end of the magnetic tape on splicing head 54 and the abutting end of the leader held on splicing head 72. Just as or immediately after the splicing tape dispenser-applicator is restored to its at-rest position (FIG. 1), the lobe A of cam 281 reopens motor control switch 388 to stop motor 276. It is to be noted that in the interval between the time that cam 283 allows the turbine air valves 263 and 264 to reclose and cam 282 causes the brake air valve 265 to open, the feed turbine rotates far enough to cause cam 253 to reopen switch 259. Hence when the lobe A of cam 281 reopens motor control switch 388, switch 259 does not provide a closed energizing circuit for the motor.

As soon as the splicing operation for the trailing end of the wound tape and the second leader is finished, the operator pulls the spliced tape and leader off of the splicing heads 54 and 72 and then presses the jog button 302 to open air valve 306. This supplies air to the wind turbine so that the latter will cause the spindle 180 to draw the trailing end of the spliced tape fully into the cassette. Then the cassette is ejected from the holder by pressing on button 140 and a new empty cassette is inserted for filling as above described. It is to be noted that the tape being wound is oriented so that its magnetic coating is face down when passing over splicing heads 54 and 70. However, because it reverses its travel as it passes around idler 52 to the cassette, the tape is wound into the cassette with its coated side facing out as is required in order for it to be scanned by a write or read head when inserted into a cassette recorder or player. It is to be noted also that the idlers 49 and 52 are located so that when magnetic tape is being wound its coated side does not touch the splicing heads 54 and 72 but is spaced therefrom by a small gap. This assures that the magnetic coating will not be degraded by abrasion with the splicing heads.

The machine can also be used to splice the wind tape on cassette hubs before the latter are installed in the cassette case. For this application the holder 130 is omitted and an additional free-wheeling spindle is mounted in panel 52 near to spindle 180 but not so close as to interfere with tape being wound thereon. The operator is provided with pairs of cassette hubs with a leader tape connecting each pair. One hub is placed on each spindle and the connecting leader is placed over the splicing heads 54 and 72. Then the operator presses start button 300 and the machine will slit the leader tape into separate leaders and splice and wind tape just as described above. When the operation is completed, and hubs are removed and installed in a cassette case.

As mentioned above, the machine also may be used to splice and wind pre-recorded tape using the magnetic head 68 to detect a recorded signal (hereinafter referred to as a "Q signal") that indicates where the tape is to be cut. Because of the high speed at which the tape is wound, the machine cannot stop the tape as soon as the Q signal is read, and that point at which the tape is to be cut will have travelled past the stationary splicing head and been wound into the cassette by the time the tape is brought to a halt. Accordingly for this alternative embodiment it is necessary to provide means for reversing the winding operation. Referring now to FIG. 11 this can be achieved by providing the two turbines with additional air inlet ports 430 (see FIG. 5) and 431 (FIG. 4) which are slanted in a direction opposite to ports 23 and 200 respectively so that air supplied thereto from the air supply 394 will cause the turbines to rotate in the reverse direction. In this alternative embodiment the tape length selection switches 295–298, the tape length control switches 256–259, and the cam mechanism comprising cams 250–253 driven by the feed turbine, and the programming cams 282 and 283 are omitted (unless the machine is to provide the option of winding either unrecorded or recorded tape). However, this alternative embodiment does include other components that provide the necessary cycle control when using the magnetic read head 68. These additional components are shown in FIGS. 11 and 12.

Referring now to FIG. 11, although not shown, it is to be understood that the control system for the machine when adapted to process prerecorded tape includes the pneumatic system of FIG. 9 but modified by elimination of cams 282 and 283 and switches 390 and 391 and inclusion of another programming cam 432 operated by motor 276, a switch 434 operated by cam 432, another solenoid air valve 435 similar to valves 263–265 and an electronic control module 436. The valve 435 has its inlet port connected to the high pressure air supply 394 and its outlet port connected to the reverse inlet ports 430 and 431 of turbines 21 and 186 respective-16. Switch 434 is normally open and closes when its operating arm is engaged by the lobe of cam 432. Closing of switch 434 conditions the electronic control module so that it will cycle the machine in response to detection of a recorded Q signal by the read head 68.

The electronic control module is shown in greater detail in FIG. 12. Referring now to that figure one side of switch 434 is connected via a terminal 437 to a source of positive potential and the other side is connected to one end of the solenoid 438 of a relay having a pair of normally open contacts 439 and 440 and a pair of normally closed contacts 441 and 442. The other end of relay solenoid 438 is grounded. The contact 439 is connected to terminal 437 and contact 440 is connected to coil 438 by way of a resistor 443. A capacitor 444 is connected between ground and contact 440. The latter contact is also connected to resistor 443 and one end of the solenoid 446 of a second relay having two sets of contacts. The first set comprises two stationary contacts 447 and 448 and a moveable contact 449 that is normally closed on contact 447 and open with respect to contact 448. Contact 447 is connected to ground via the solenoids of valves 263 and 264 that control the flow of air to the forward direction inlet ports of the feed and wind turbines. Contact 448 is connected to one end of the solenoid of valve 435 that controls the flow of air to the reverse direction inlet ports of the two turbines. Contact 449 is connected to the junction of solenoid 446 and contact 440 and also to one end of the solenoid of valve 265 that controls the flow of air to the brake actuating cylinders 212 and 271. The other set of contacts of the second relay comprises a pair of normally open contacts 450 and 451. These contacts are connected in series with contacts 441, 442, a pair of input terminals 452, 453 which are connected to an a.c. power supply, and motor 276. The switch 388 that is operated by cam 281 and the manual start switch 304 are each connected in parallel with each other and also the series-connected pairs of contacts 441, 442 and 450, 451. It is to be noted that contacts 452, 453 in FIG. 12 correspond to contacts 424 and 425 in FIG. 10 and that the relationship of motor 276 and switches 304, 388 is the same in both figures.

Still referring to FIG. 12, the upper end of solenoid 438 is connected to the bottom end of solenoid 446 by way of a capacitor 454 and a diode 455. A resistor 456 is connected between ground and the junction of capacitor 454 and diode 455. The bottom end of solenoid 446 is also connected to the anode of an SCR switch 458 which has its cathode grounded. The magnetic read head 68 (FIG. 3) is connected to the input side of an amplifier 459 whose output side is connected to the gates of SCR switches 458 and 462.

The bottom end of relay solenoid 446 is also connected by a resistor 460 to the gate of a second SCR switch 461 which has its cathode grounded and its anode connected to the output side of amplifier 459 and the gate of a third SCR switch 462. The latter has its cathode grounded and its anode connected to the solenoid of valve 265 and also to the bottom end of relay solenoid 446 by a capacitor 463. Another capacitor 464 is connected between ground and the output side of amplifier 459.

Operation of the control system shown in FIGS. 11 and 12 will now be described. When the start switch 304 is closed manually to start motor 276, the programming cams will cause the machine to cycle in the manner previously described to slit the cassette leader tape into two cassette leaders and to splice one leader to the leading end of the use tape to be spliced. Then just before lobe B of cam 281 reopens motor control switch 388, cam 432 closes switch 434. When this occurs, relay solenoid 438 is energized to close contacts 439, 440 and open contacts 441, 442. The closing of contacts 439, 440 establishes a current path for solenoid 438 via resistance 443 so as to keep it energized after switch 343 reopens which occurs just before motor switch 388 is reopened. The closed contacts 439, 440 allow capacitor 444 to be charged up by the d.c. potential at terminal 437 and also allows current to flow through the solenoids of valves 263 and 264 whereby said valves open to pass high pressure air to turbines 21 and 186, whereupon the winding operation starts. The closing of contacts 439, 440 provides a path through relay coil 446 to couple the positive potential at terminal 437 to the gate SCR switch 461, causing the latter to conduct.

The winding operation continues until the Q signal recorded on the tape being wound is detected by magnetic head 58 and amplified by amplifier 459. The signal output from amplifier 459 charges capacitor 464 to the level required to fire SCR switch 458. The SCR switch 462 will not fire at this time because of its gate being tied to SCR switch 461 which is on. The conduction of SCR switch 458 enables an energizing current to flow through relay solenoid 446 to switch contact 449 into open relation with contact 447 and closed relation with contact 448. This enables the solenoid of valve 435 to be energized so as to open said valve to supply air to the turbines 21 and 186 via their reverse direction inlet ports. However, the firing of SCR switch 458 allows capacitor 463 to charge up through the solenoid of valve 265, and this occurs before contact 449 closes on contact 448. The current charging capacitor 463 causes the solenoid of valve 265 to be energized momentarily until the capacitor is charged. Since valve 265 controls the brake cylinders 212 and 271, the turbines are braked momentarily just before air is introduced by valve 435 to the turbines to cause them to reverse direction. The tape now moves over the splicing head in the reverse direction so as to cause the Q signal to be redetected by the read head 68. In this connection it is to be noted that turning the SCR switch 458 on causes the gate of SCR switch 461 to go to virtual ground and capacitor 464 to discharge. Hence SCR switch 461 will stop conducting and thereby condition SCR switch 462 for firing when the recorded signal is reread by magnetic head 68. As the Q signal is reread, SCR switch 462 will conduct and this in turn will cause capacitor 463 to discharge and diode 455 to conduct to charge capacitor 454. Charging of capacitor 454 has the effect of reducing the current flowing through relay solenoid 438 sufficient to cause relay contacts 439, 440 to reopen and contacts 442, 441 to reclose. Reopening of contacts 439, 440 causes the relay solenoids to be deenergized, with the result that capacitor 444 discharges through the solenoid of air valve 265. When this occurs air valve 265 is reopened and the brake cylinders 212 and 271 are actuated to stop the two turbines. Valve 265 recloses when capacitor 444 is discharged.

The relay solenoid 446 also is deenergized when contacts 439, 440 reopen. Since relay solenoid 438 is deenergized before relay solenoid 446, contacts 441, 442 reclose before contacts 450, 451 reopen, with the result that motor 276 is energized and rotates the programming cams far enough to allow switch 388 to reclose before contacts 450, 451 reopen. Once switch 388 is reclosed, the motor 276 will continue to run to complete the cycle of operations in the manner described in connection with the foregoing description of FIGS. 9 and 10.

Where the tape being wounded carries prerecorded audio information, the Q signal has an amplitude large enough and a frequency low enough, e.g. 6–15 cycles per second, to be readily distinguished from the audio signals.

The machine as above-described offers many advantages, including reliability, automatic operation, ability to handle blank or prerecorded magnetic tape, and high operating speed. By way of illustration but not limitation, the machine can load a cassette with enough tape for 60 minutes running time based on dual track recording, (about 300 feet of tape) in a total cycle time of about 22 seconds from start to final splice. Also, although the machine has been described as means for winding and splicing magnetic tape, it also may be used to perform the same operation on photographic film provided the cassette holder is modified to hold a photographic film cassette and the various tape handling components such as the splicing heads and idler roller are sized for the film to be processed. Accordingly, as used herein the terms "recording tape" and "use tape" are to be construed as including photographic film as well as magnetic tape. It also is to be noted that the magnetic head may be replaced by an optical scanner comprising a light osurce for illuminating the magnetic tape and a photocell for producing an output signal similar to that produced by the magnetic head when a signal aperture is detected in the tape. The combination of air turbines and a speed synchronizer for the turbines assures high speed winding with fairly constant winding tension and may be used apart from the machine herein described. The splicing tape dispenser-applicator is simple, reliable and fast acting and also may be used apart from the illustrated machine, e.g. to splice movie film or other elongate ribbon materials such as paper recording tape. It also is contemplated that the pneumatic control system may be modified by the addition of manually operable air valves to permit selective individual operation of the pneumatic actuators 125, 160, 358, and 372. Still other advantages and possible modifications of the invention are believed obvious to persons skilled in the art.

What is claimed is:

1. Apparatus for use in splicing two tape leaders to the opposite ends of a recording tape by application of short lengths of adhesive splicing tape comprising:

a first stationary block having a first surface for supporting the end of a first tape leader;

means for releasably holding said first tape leader end on said first surface;

a second splicing block having a second surface for supporting the end of a second tape leader, said second splicing block mounted for movement between a first position wherein said second surface is contiguous with said first surface and a second position wherein said second surface is displaced from said first surface;

means for releasably holding said second tape leader end on said second surface;

a third splicing block having a third surface for supporting the end of a recording tape, said third splicing block mounted for movement between a third position wherein said third surface is contiguous with said first surface and a fourth position wherein said third surface is displaced from said first surface, said second and third splicing blocks being disposed so that one of said second and third surfaces is displaced from said first surface when the other of said second and third surfaces is contiguous with said first surface, means for releasably holding said recording tape end on said third surface;

means for moving said second splicing block from one to the other of said first and second positions;

and means for moving said third splicing block from one to the other of said third and fourth positions, whereby a selected length of said recording tape may be provided with a tape leader at both ends by (a) positioning and holding the ends of first and second tape leaders on said first and second surfaces respectively and the end of said recording tape on said third surface, (b) splicing together the said ends of said first tape leader and said recording tape while said third surface is contiguous with said first surface, (c) advancing a selected length of said recording tape over said third and first surfaces in turn, (d) severing said recording tape at a preselected point along one of said first and third surfaces so that said selected length of recording tape has a trailing end, (e) moving said splicing blocks so that said second surface is contiguous with said first surface, and (f) splicing the end of said second tape leader on said second surface to the adjacent trailing end of said selected length of recording tape on said first surface.

2. Apparatus for splicing leader tapes to the ends of a length of recording tape comprising;

first, second, and third splicing blocks each having a surface for supporting one of said tapes and means for locating said one tape along a predetermined line on said surface, and means for moving said second and third blocks so as to alternately place their said surfaces into contiguous relation with the said surface of said first block.

3. Apparatus for splicing two leader tapes to the ends of a length of recording tape comprising;

first, second and third splicing blocks each having a channel on one surface thereof for receiving and supporting one of said tapes, and means for moving said second and third blocks with respect to said first block so as to alternately place the said channels thereof into alignment with the said channel of said first block.

4. Apparatus according to claim 3 wherein each of said blocks further includes means for releasably holding one of said tapes in the said channel thereof.

5. Apparatus according to claim 3 wherein each of said blocks includes suction means for releasably holding one of said tapes in its said channel.

6. Apparatus according to claim 3 wherein said second and third blocks are moveable in a plane common to all of said channels.

7. Apparatus according to claim 3 wherein said channels are all located in a common plane.

8. Apparatus according to claim 3 wherein each of said blocks has an interior passageway that opens into the said channel thereof, and further including means for connecting said each passageway to a source of vacuum.

9. Apparatus according to claim 3 further including a panel to which said first block is affixed and means attached to said panel supporting said second and third blocks for movement by said moving means, each of said surfaces extending at a right angle to said panel.

10. Apparatus according to claim 9 wherein said channels extend parallel to said panel and are located in a common plane.

11. Apparatus according to claim 9 wherein said panel is oriented so that the said surface of said first block extends horizontally.

12. Apparatus according to claim 3 wherein said channels have flat bottoms.

13. Apparatus according to claim 3 wherein said second and third blocks are mounted for pivotal movement.

14. Apparatus for use in splicing at least two leader tapes to the opposite ends of a recording tape comprising;

a first stationary block having a first surface with a channel for receiving and supporting the end of one of said tapes;

means for releasably holding said one tape in the channel of said first surface;

a second splicing block having a second surface with a channel for receiving and supporting the end of another one of said tapes, said second splicing block mounted for movement between a first position wherein said second surface is contiguous with said first surface and a second position wherein said second surface is displaced from said first surface;

means for releasably holding said another tape in the channel of said second surface;

a third splicing block having a third surface with a channel for receiving and supporting the third of said tapes, said third splicing block mounted for movement between a third position wherein said third surface is contiguous with said first surface and a fourth position wherein said third surface is displaced from said first surface, means for releasably holding said third tape in the channel of said third surface;

means for moving said second splicing block from one to the other of said first and second positions;

means for moving said third splicing block from one to the other of said third and fourth positions; and means for operating the said means for moving said second and third splicing blocks so that said third splicing block is moved to said fourth position when said second splicing block is moved to said first position and said third splicing block is moved to said third position when said second splicing block is moved to said second position.

* * * * *